United States Patent [19]
Denoel et al.

[11] Patent Number: 5,765,367
[45] Date of Patent: Jun. 16, 1998

[54] SYSTEM FOR CONTROLLING A SPACE VEHICLE BY GATING GAS

[75] Inventors: Jean Denis Denoel, Pessac; André Dumortier, Merignac, both of France

[73] Assignee: Societe Europeenne de Propulsion, Suresnes, France

[21] Appl. No.: 733,804

[22] Filed: Oct. 18, 1996

[30] Foreign Application Priority Data

Oct. 20, 1995 [FR] France .................. 95 12361

[51] Int. Cl.⁶ .......................................... F02K 9/08
[52] U.S. Cl. .................................. 60/229; 60/254
[58] Field of Search ............... 60/229, 234, 254; 244/169

[56] References Cited

U.S. PATENT DOCUMENTS

| | | | |
|---|---|---|---|
| 2,613,497 | 10/1952 | MacDonald | 60/35.6 |
| 3,178,883 | 4/1965 | Webb | 60/35.5 |
| 3,330,114 | 7/1967 | McQueen | 60/204 |
| 3,721,402 | 3/1973 | Holland | 60/229 |
| 3,726,088 | 4/1973 | Kretschmer et al. | 60/229 |
| 3,736,749 | 6/1973 | Kretschmer et al. | 60/229 |
| 4,826,104 | 5/1989 | Bennett et al. | 244/3.22 |
| 5,062,593 | 11/1991 | Goddard et al. | 244/169 |

FOREIGN PATENT DOCUMENTS 2588372 10/1987 France .

*Primary Examiner*—Louis J. Casaregola
*Attorney, Agent, or Firm*—Weingarten, Schurgin, Gagnebin & Hayes LLP

[57] ABSTRACT

The control system comprises a plurality of nozzles pointing in different directions, a plurality of gas generators, and pipework connecting the gas generators to the nozzles via gates for allowing or preventing gas being ejected therethrough. Each gas generator is fitted with a shutter disposed in an outlet passage connecting the generator to the pipework, the shutter having a closed position in which it closes the outlet passage by bearing against a seat formed in the passage and against which it is pressed when the generator is not ignited so as to isolate the gas generator in sealed manner from gas contained in the pipework and coming from other generators, the shutter being automatically lifted off its seat to move from the closed position to an open position under the effect of the pressure produced in the generator in response to being ignited, thereby enabling control to be performed with gas generators being ignited independently of one another.

7 Claims, 2 Drawing Sheets

1

SYSTEM FOR CONTROLLING A SPACE VEHICLE BY GATING GAS

The present invention relates to a control system that operates by gating gas, in particular a control system comprising a plurality of nozzles pointing in different directions, a plurality of gas generators, and pipework connecting the gas generators to the nozzles via gates fitted to the nozzles to allow or to prevent gas from being ejected therethrough.

BACKGROUND OF THE INVENTION

Such a control system is used in particular for space vehicles, particularly for the purpose of placing them or the payloads they carry on predetermined trajectories.

In such an application, the usual procedure consists in igniting the various gas generators simultaneously so as to provide a total flow rate Q for time t which is the operating time of a generator. The gases produced by the generators are distributed by the pipework so as to be ejected through nozzles which are selected by controlling gates associated with the nozzles as a function of the attitude to be imparted to the space vehicle.

In order to make the control system more flexible, it would be advantageous to ignite the gas generators independently with a corresponding increase in duration of control. Thus, with four gas generators, for example, it would be possible to obtain a flow rate Q/2 for a time 2t by igniting pairs of generators in succession, or a flow rate Q/4 for a time 4t by igniting single generators in succession, or indeed the combination of a flow rate Q/2 for a time t (two generators ignited simultaneously) plus a flow rate Q/4 for a time 2t (two generators ignited in succession).

Nevertheless, no later than igniting one or some of the generators, it becomes necessary to isolate the other generators whose ignition is to be differed in order to avoid them being fired in untimely manner by the hot gas coming via the pipework from a generator already in operation. A gas generator must be isolated in such a manner as to withstand hot gas at high pressure in the pipework but without impeding subsequent ignition of the generator and immediate delivery into the pipework of the gas it produces.

OBJECTS AND SUMMARY OF THE INVENTION

An object of the invention is to provide a control system capable of satisfying these conditions. This object is achieved with the system as defined at the beginning of the description, in which each gas generator is fitted with a shutter disposed in an outlet passage connecting the generator to the pipework, the shutter having a closed position in which it closes the outlet passage by bearing against a seat formed in the passage and by being pressed thereagainst while the generator is not ignited so as to isolate the gas generator in sealed manner from gas contained in the pipework and coming from other generators, the shutter being automatically lifted off its seat to move from the closed position to an open position under the effect of the pressure produced in the generator in response to being ignited, thereby enabling control to be performed by igniting the gas generators independently from one another.

Preferably, the shutter associated with a gas generator is locked in the closed position and is automatically unlockable in response to the gas generator being ignited. For example, the shutter may be locked by means of at least one frangible pin suitable for being broken by the pressure of the gas produced in response to the gas generator being ignited.

Also advantageously, each shutter is provided with means for locking it automatically in its open position.

BRIEF DESCRIPTION OF THE DRAWINGS

A particular embodiment of the control system of the invention is described below in indicative but non-limiting manner, with reference to the accompanying drawings, in which.

MORE DETAILED DESCRIPTION

Figure 1:
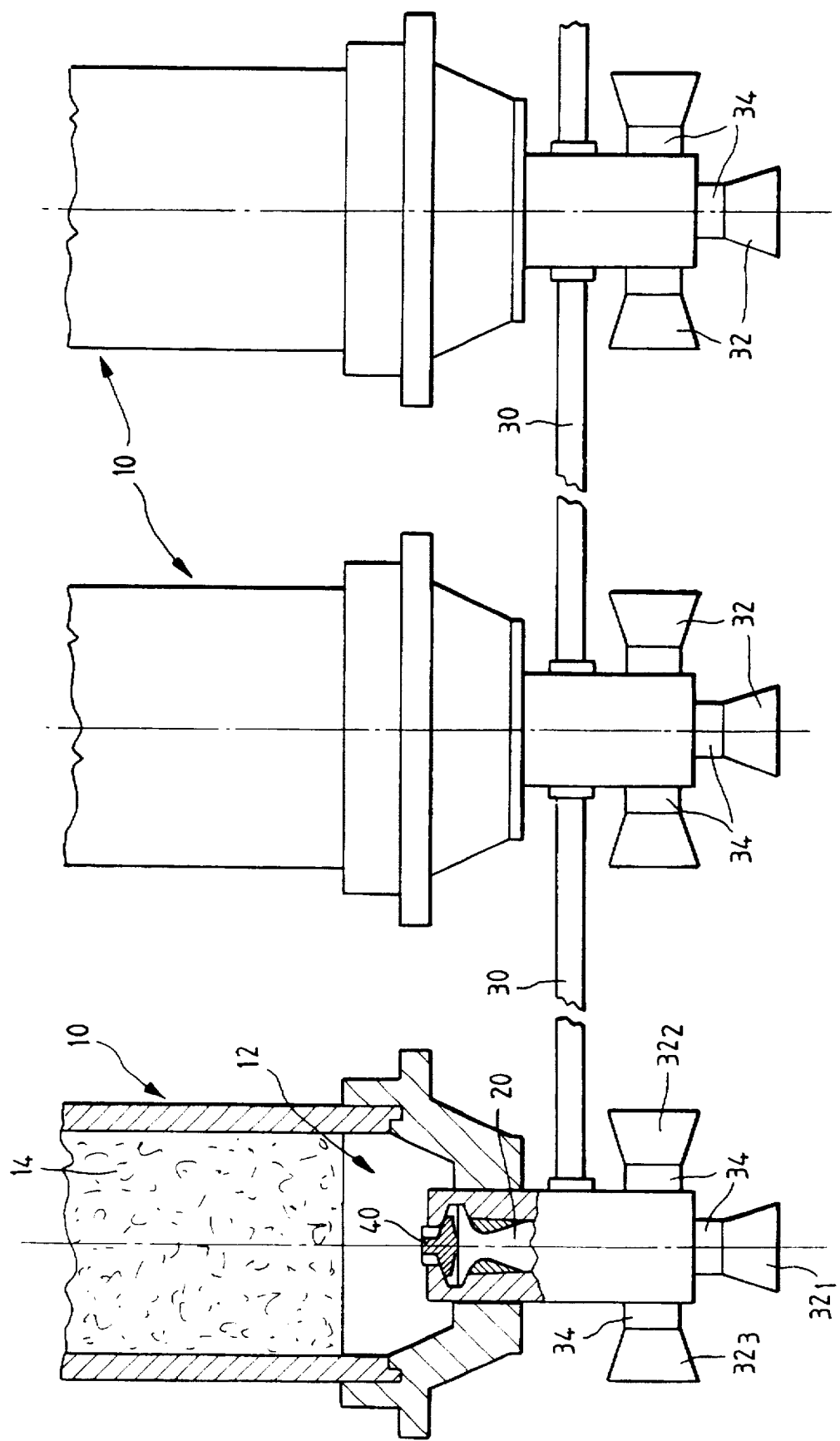
FIG. 1 shows highly diagrammatically and in developed manner a portion of a system for controlling a space vehicle by gating hot gas.

FIG. 1 shows in developed manner a conventional disposition for a control system having a plurality of gas generators 10. These are fixed on the periphery of a space vehicle, being uniformly distributed thereabout, there generally being four of them (only three are shown in FIG. 1).

Each gas generator 10 comprises a combustion chamber 12 containing solid propellant 14. The chamber 12 communicates via a passage 20 with nozzles 32 that enable the combustion gases produced by the generator to be distributed to a plurality of nozzles 32 pointing in different directions and fitted with individual gates 34. In the example shown, three nozzles $32_1$, $32_2$, and $32_3$ are mounted on each gas generator. Still by way of example, one of the nozzles $32_1$ may be pointed so as to exert axial thrust while the other two nozzles $32_2$ and $32_3$ may point so as to exert radial thrust in two substantially opposite directions. It should be observed that the nozzles are mounted in groups of three on the gas generators merely for reasons of convenience, given that the pipework 30 serves to make it possible for any of the nozzles to receive gas produced by any of the gas generators. In conventional manner, the gates 34 are controlled individually and selectively as a function of the attitude to be imparted to the space vehicle.

According to the invention, each gas generator 10 is provided with a shutter 40 (FIGS. 1, 2A, 2B) located in its outlet passage 20 so as to put the gas generator selectively into communication with the pipework 30.

The shutter 40 has a shutter body 42 constituting a valve member. Radial ribs or fins 44, 46 secured to the valve member are formed on both faces thereof so as to guide the shutter axially in the passage 20.

The outlet passage 20 is defined by a tubular part 22 extended at its upstream end (upstream relative to the flow direction of gas produced by the generator) by a ring 24 and a sleeve 26. The sleeve 26 is screwed on the tubular part 22 and has an internal shoulder 27 which bears against the ring 24, holding it between the upstream end of the part 22 and the sleeve 26. It will be observed that the contacting faces of the ring 24 and of the part 22 have complementary stepped shapes for mutual centering thereof.

Going upstream from the shoulder 27, the inside wall of the sleeve 26 has a cylindrical portion 26a which runs into a smaller-diameter cylindrical portion 26b via a frustoconical portion 28 whose diameter decreases going upstream. The surface 28 constitutes a valve seat cooperating with the shutter body 42 on the upstream face 42a thereof. An annular sealing gasket 43 is received in a groove formed in the face 42a of the shutter body. The radial fins 44 on the face 42a of the shutter body extend over a radius that is substantially equal to or very slightly smaller than that of the cylindrical wall 26b so that the shutter is guided during its axial displacement.

Going downstream from its upstream end face in contact with the sleeve 26, the ring 24 has an inside wall that has a cylindrical portion 24a connected to a smaller-diameter cylindrical portion 24b via a frustoconical portion 25 whose diameter tapers downstream. The frustoconical surface 25 constitutes an abutment co-operating with the downstream ends of the fins 46 situated on the downstream face 42b of the shutter body. The downstream ends of the fins 46 are chamfered to have a shape that corresponds to the shape of the frustoconical abutment 25. It will be observed that the radial fins 46 extend over a radius substantially equal to or very slightly less than the radius of the cylindrical walls 26a and 26b and also contribute to guiding the shutter during its axial displacement.

In the closed position (FIG. 2A), the shutter 42 is pressed against the seat 28 and, in particular because of the sealing gasket 43, it isolates the gas generator from the passage 20 and the pipework connected thereto. The shutter 42 is locked in its closed position by means of frangible pins 45 which are inserted in radial holes formed in the upstream end portion of the sleeve 26. The pins 45 penetrate into radial housings formed in the ribs 44, or in at least some of them, said housings extending inwards from the outside faces of the ribs.

When the shutter is in the closed position, the appearance of hot gas in the pipework communicating with the passage 20 due to one or more other generators being ignited establishes higher pressure on the downstream face of the shutter 42. This presses the shutter more firmly against the seat 28, preventing access to the gas generator associated therewith and thus preventing it from being ignited in untimely manner by the hot gas. The pins 43 are not subject to breaking stresses under these circumstances.

Figure 2A:
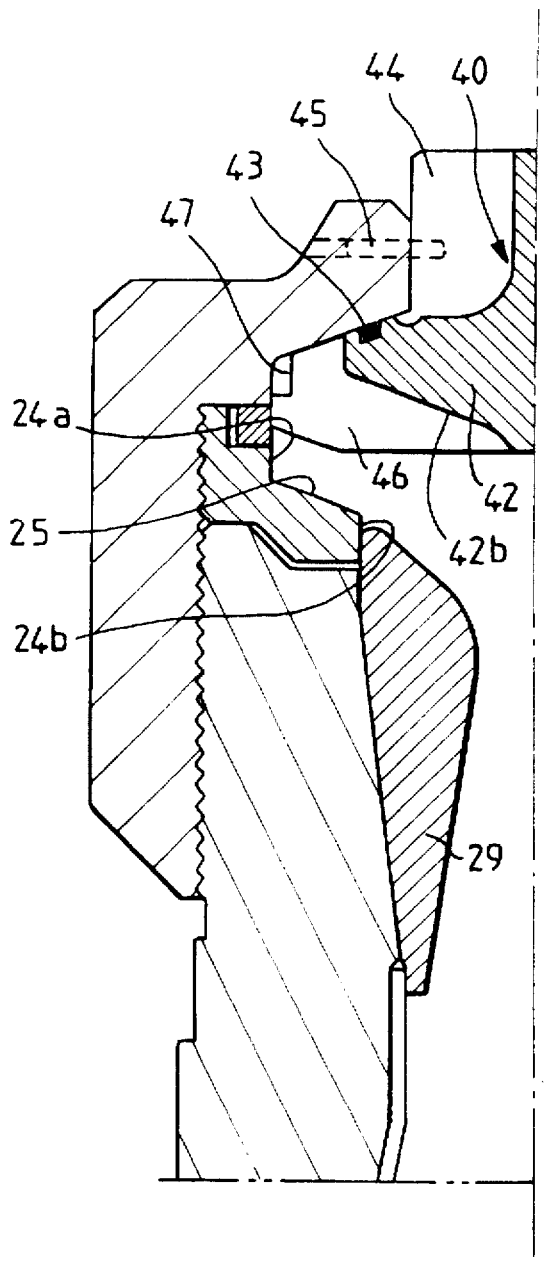
FIGS. 2A and 2B are more detailed half-views in section showing the shutter of a gas generator in the system of FIG. 1 respectively in its closed position and in its open position.
Figure 2B:
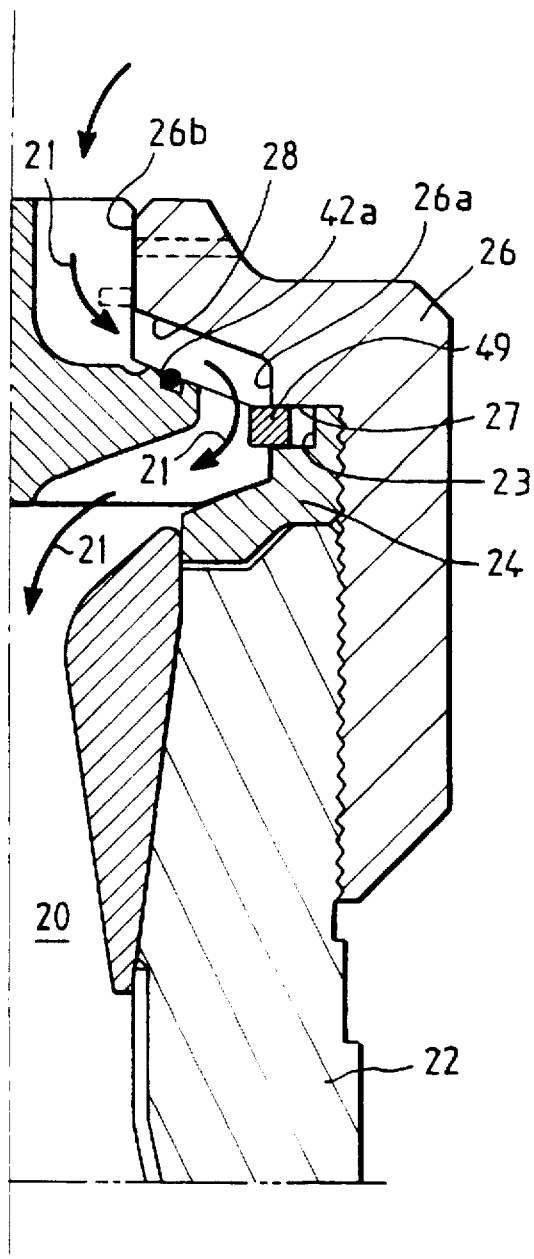

As soon as the gas generator is ignited, the pressure on the upstream face of the shutter 42 increases suddenly, thereby breaking the pins 45. The shutter moves towards its open position (FIG. 2B) in which the fins 42 press against the abutment surface 25. During this movement, the shutter is guided along the walls 26b, 26a, and 24a by the fins 44, 46. It will be observed that the fins 46 project beyond the side surface and the downstream surface of the shutter (i.e. on its face 42b), such that a passage (arrows 21) is opened to allow the gas to pass around the shutter, thereby establishing communication between the gas generator and the pipework. As soon as it reaches the open position, the shutter 42 is locked in said position by means of a resilient split retaining ring 49 which is received in a groove 23 formed in the upstream end of the ring 24 and which co-operates with steps 47 formed in the ends of the fins 46. While the shutter is in its closed position, the retaining ring is held in the groove 23 by the ribs 46 (FIG. 2A). When the shutter reaches the open position, the retaining ring is partially released by the steps 47 coming face to face with the groove 23.

A sonic throat is provided in the passage 20 downstream from the shutter to avoid disturbing the calibrated flow rate from the gas generator. The sonic throat may be formed by a part 29 added to the upstream end of the tubular part 22.

Because of the high temperatures of the gases leaving the generator, the parts that come into contact with them, and at least the shutter 42, the sleeve 26, the ring 24, and the throat 29 are made of refractory material, e.g. a carbon-carbon composite material, while the retaining ring 49 is made of refractory metal.

We claim:

1. A control system operating by gating gas, the system comprising a plurality of nozzles pointing in different directions, a plurality of gas generators, each having a combustion chamber with a gas outlet, a pipework, and a plurality of nozzle gates each connecting the pipework to a respective nozzle, wherein each gas generator is provided with a respective individual shutter located in an outlet passage connecting the gas outlet of the gas generator to the pipework, the shutter having a closed position in which it closes the outlet passage by bearing against a seat surface formed in the outlet passage and by being pressed thereagainst while the respective generator is not ignited so as to isolate the respective gas generator in sealed manner from gas contained in the pipework and coming from other generators, and an open position in which it bears against and is retained by an abutment surface formed in the outer passageway downstream of said seat surface and allows gas produced by the respective gas generator to flow through the outlet passage to the pipework, the shutter being automatically lifted off said seat surface to move from the closed position to the open position under the effect of the pressure produced in the respective gas generator in response to the gas generator being ignited, thereby enabling control to be performed by igniting the gas generators independently from one another.

2. The control system according to claim 1, wherein each shutter is locked in its closed position by means of respective locking means, said locking means being automatically releasable under the effect of the pressure of the gas produced in response to the gas generator being ignited.

3. The control system according to claim 2, wherein said locking means includes at least one frangible pin.

4. The control system according to claim 1, wherein each shutter is locked in an open position by means of respective locking means.

5. The control system according to claim 1, wherein each shutter is housed in an enlarged portion of the respective outlet passage, said enlarged portion having opposite surfaces forming said seat surface and abutment surface and a side surface forming a guiding surface for the shutter when moving from the closed position to the open position.

6. The control system according to claim 1, wherein said shutter includes a valve member and ribs extending from the valve member, said ribs defining passages therebetween, the valve member bearing against said seat surface when the shutter is in the closed position, and the ribs bearing against said abutment surface when the shutter is in the open position, said passages defined between the ribs allowing the gas produced by the respective gas generator to flow through the outlet passage.

7. The control system according to claim 1, further comprising a plurality of sonic throats, each located in a respective outlet passage connecting a respective gas generator to the pipework.

* * * * *